(12) United States Patent
Obeid et al.

(10) Patent No.: US 10,714,957 B1
(45) Date of Patent: Jul. 14, 2020

(54) CHARGE STATE CONTROL SYSTEM AND DEVICE

(71) Applicants: Mazen Obeid, Gloucester (CA); Jeffrey Anthony Rossi, Toronto (CA); Jason de Sousa, Gloucester (CA)

(72) Inventors: Mazen Obeid, Gloucester (CA); Jeffrey Anthony Rossi, Toronto (CA); Jason de Sousa, Gloucester (CA)

( * ) Notice: Subject to any disclaimer, the term of this patent is extended or adjusted under 35 U.S.C. 154(b) by 0 days.

(21) Appl. No.: 16/558,479

(22) Filed: Sep. 3, 2019

(51) Int. Cl.
*H02J 7/00* (2006.01)

(52) U.S. Cl.
CPC .......... *H02J 7/0072* (2013.01); *H02J 7/0045* (2013.01)

(58) Field of Classification Search
CPC .................................................... H02J 7/0072
USPC ........................................................ 320/137
See application file for complete search history.

(56) References Cited

U.S. PATENT DOCUMENTS

| | | | |
|---|---|---|---|
| 6,342,774 B1 * | 1/2002 | Kreisinger | H01M 10/0525 320/107 |
| 7,202,635 B2 * | 4/2007 | Patino | H02J 7/008 320/160 |
| 9,787,106 B2 * | 10/2017 | Maleki | H02J 7/008 |
| 10,116,149 B1 | 10/2018 | Dao et al. | |
| 2004/0222768 A1 * | 11/2004 | Moore | H02J 7/0075 320/128 |
| 2009/0063877 A1 * | 3/2009 | Lewis | G06F 1/266 713/310 |
| 2015/0180248 A1 | 6/2015 | Yang | |

FOREIGN PATENT DOCUMENTS

| | | |
|---|---|---|
| CN | 106684482 A | 5/2017 |
| CN | 106788076 A | 5/2017 |
| EP | 3266642 A1 | 1/2018 |

* cited by examiner

*Primary Examiner* — Jerry D Robbins
(74) *Attorney, Agent, or Firm* — Dorton & Willis, LLP; Ryan Willis (57) ABSTRACT

A charge state control system and device for controlling charge sent to a consumer device is disclosed. A software application is provided on a consumer device. A separate hardware device comprises a microprocessor; a transistor relay circuit which is controlled by the microprocessor to open or close a relay; and a connector for connection with the consumer device. The software application is configured to receive an input from a user, determine a battery level of the consumer device and communicate with the hardware device to instruct the microprocessor to open or close the relay depending upon the battery level and the input.

14 Claims, 5 Drawing Sheets

CHARGE STATE CONTROL SYSTEM AND DEVICE

INTRODUCTION TO THE INVENTION

In general, this disclosure relates to a charge state control system and device. In particular, the present disclosure sets forth a separate hardware device for controlling the current flowing to a consumer device in order to limit the charge of the battery in the consumer device to a specified charging range.

It is well established through current research that lithium-based batteries suffer a great reduction in achievable cycle life (overall useable lifespan) when repeatedly charged to and held at a voltage corresponding to full capacity (100%, approx. 4.2-4.25 V). The stated loss in capacity and cycle life is due to the fact that lithium cells are stressed and suffer from internal degradation when held at charge levels higher than 80%, especially in combination with elevated temperatures during charging (>35 C). However, it is not in the interest of device manufacturers to reduce the maximum charge voltage or alter the charging regime of integral lithium batteries in consumer electronics for various reasons.

Manufacturers have the desire to advertise the highest possible number of hours attainable between charges. They accomplish this by charging the internal lithium cells to the highest voltage possible without compromising safety. This leads to a longer time period between charges when the device is new, but comes at the expense of overall useable battery life in the long run, often causing noticeable loss of capacity in as little as 6 months. Once capacity is lost, the battery will not last anywhere near the initial time period before requiring a charge. Secondly, consumer electronic devices are considered disposable, despite their high prices, and manufacturers build in this obsolescence to sell more devices or monetize integral battery replacements on existing devices. Consumers have little to no control over this as battery charging regimes are hard coded and not user configurable. Taking control of the battery charging process would allow consumers to extend the useable lifespan of their device by improving overall battery performance over a much longer period of time.

Currently, there is no automated solution for these issues. In order to take control of the maximum battery charge percentage, a user must manually monitor the battery charge percentage and unplug the device from the charging apparatus before the user's desired charge level is obtained and/or exceeded. It is up to the user to manually control this process. Should a user not closely monitor the battery charge of the device, maximum battery charge level will be reached and degradation of the battery will occur. On devices with Android operating systems, the device can be "rooted" (also known as removing manufacturer security and protection of the device software) so that power users can take control of the battery charging hardware via modifications to operating system code. This is not recommended nor desirable as it invalidates device warranty, makes the device less secure by eliminating regular security updates, and also limits the use of mobile payment applications.

While various charging circuits exist, none of them contemplate a solution to this problem.

U.S. Publication No. 20150180248 teaches an apparatus and method for protecting a battery from over voltage by using two battery protection circuits (analog and digital) that monitor the battery charging voltage and produce a signal when the voltage is outside of certain reference voltage ranges. The two protection circuits control a relay that is electrically connected to the battery protection circuit in order to control the battery charging voltage. A microcontroller unit has internal software to compare the measured voltages to the reference voltages. The relay is opened when the control signal mixer receives a positive signal from the first or second battery protection circuits.

U.S. Pat. No. 10,116,149 teaches an automatic control system for a rechargeable battery system. The system measures the state of charge of the battery and automatically switches from charging to discharging depending upon threshold limits that have been either pre-set or dictated by a user. A microprocessor is coupled with the battery system and the automatic controller. The microprocessor includes a program that controls the charging based on various configuration data.

European Patent application No. EP3266642 teaches an apparatus for preventing overcharge of a battery in an eco-vehicle, particularly in the case in which the battery management system fails. The system relies on a reference voltage or threshold voltage and automatically redirects current when the reference voltage is reached. A relay is used to allow or block charging of the battery.

Chinese Patent Application No. 106684482 teaches a battery overcharge protection system for charging rechargeable batteries that are in a charger. The application uses hardware and software protection of the batteries by using an insulation detection module that has internal software as the first line of control and comparators for the second line of hardware control. A switch or relay is turned off when the voltage of the battery is greater than a reference voltage.

Chinese Patent Application No. 106788076 relates to battery overcharge protection systems for vehicles, in this case a balance car. The overcharge protection system protects the battery from becoming overcharged due to charge being fed to the battery during braking. A relay is used to disconnect the charging circuit once a maximum charging voltage is reached.

Many different charging standards and voltages exist in personal electronic devices today. Typical USB-based charging regimes of 2.1 A and 5V DC are not as common anymore, and manufacturers are opting in favour of variable voltages and higher amperage limits for faster charging capability. Many different charging standards exist today (such as USB PD 2.0, Qualcomm Quick Charge 1.0/2.0/3.0, Apple Fast Charge, Motorola TurboPower, MediaTek Fast Charge, Huawei Fast Charge, etc). Voltages can range from 3.3 V DC up to 20 V DC, and currents can range from 0.5 A to 5 A. Also, communication between the power supply and the device being charged cannot be interrupted, as the voltage and current negotiation between them occurs over a USB serial connection. This variability and complexity creates difficulty when attempting to design a universal charge controller compatible with all devices.

The present disclosure provides a charge state control system that is a fully automated solution, works automatically each time the device is plugged in, and automatically extends the life of the internal lithium battery according to the charge settings inputted by the user during initial setup. No manual interaction is required, and no device modification is required. The present disclosure is able to operate with the many different charging methods and cable types available for charging consumer devices on the market today.

In one example embodiment, the present disclosure relates to a physical charge state control hardware device in the form of an electronic printed circuit board consisting of power supply components, a microprocessor, a communication device, a relay, male and female USB ports (type A or type C as required), transistors, diodes, and an LED indicator. The power supply components can include voltage regulators, buck/boost transformers and/or capacitors. The communication device can be used for Bluetooth or WiFi controlled circuits, however it is optional for USB controlled circuits.

The hardware device can be physically enclosed on its own, or within other equipment such as a device charger, charging cable, or wireless charging pad/stand. The circuit can also be modified depending on the power input, for example using AC voltage when the circuit is integrated into the device charger vs DC voltage when the circuit is standalone, integrated into a device charging cable, or integrated into a wireless charging stand.

The present disclosure has much value for the end user of consumer electronic devices by extending the useful life of a user's internal lithium battery. This saves the user money by allowing them to keep their devices for a much longer period of time, and/or eliminating costly and invasive battery replacements of the internal lithium battery.

In one aspect of the present disclosure a software application on a consumer device monitors the charge percentage of the internal battery. The software application uses a communication protocol to connect to the charge state control hardware device and communicate with the microprocessor on the hardware device. The software application instructs the microprocessor to allow or disallow charging current to flow to the consumer device depending upon the battery charge percentage. A relay on the circuit board opens or closes depending upon instructions from the microprocessor. When the consumer device is removed from the control charger device and disconnects from the charge state control circuit board, the charger can operate normally for use with other devices.

Contrary to prior known solutions, the present disclosure does not monitor battery voltage directly nor is the primary purpose to prevent overcharging of a consumer device battery. The software or app component that resides on the consumer device allows the user to configure a maximum battery charge percentage of less than full. In this manner, the present disclosure allows the user to prevent the device battery from fully charging, for example, the desired battery charge percentage can be set to 80% instead of 100%. Overcharging is not a consideration at the lower charge levels.

The present disclosure prevents a consumer device and the consumer device factory charger from ever allowing the consumer device battery to reach a full charge of 100%. The user is allowed to set a desired charge level to be maintained, at a value less than full capacity. It works in conjunction with the factory charger, or alternatively, can be incorporated into a wall charger and/or wireless charger.

BRIEF DESCRIPTION OF THE DRAWINGS

The invention will be further understood from the following description with reference to the attached drawings.

DETAILED DESCRIPTION

The exemplary embodiments of the present disclosure are described and illustrated below to encompass exemplary charge state control system and device. Of course, it will be apparent to those of ordinary skill in the art that the embodiments discussed below are exemplary in nature and may be reconfigured without departing from the scope and spirit of the present disclosure. However, for clarity and precision, the exemplary embodiments as discussed below may include optional steps, methods, and features that one of ordinary skill should recognize as not being a requisite to fall within the scope of the present disclosure. An exemplary embodiment of the present disclosure will be set forth in detail with reference to the drawings, in which like reference numerals refer to like elements or method steps throughout.

In one embodiment, the present disclosure solves the issue of preserving the cycle life and charge capacity of lithium batteries in consumer devices by utilizing the processing capability of the electronic device itself. A software application is installed on the consumer's device to monitor charge level and battery temperature. A microprocessor-controlled relay circuit is provided in the charge state control hardware device for interrupting charging current. The hardware device can be situated within the charging circuit of the consumer device, whether provided by a wired or wireless charging means. Alternatively, the hardware device can be provided as a separate component. The software application utilizes readily available communication protocols such as Bluetooth, Wi-Fi, and/or USB serial connection to communicate with the microprocessor within the hardware device to command the relay within the hardware device to turn charging current on and off as required.

Should the device need to be charged in more than one location, the software application is able to pair with and control many hardware devices without any repeated requirement for re-configuration or re-pairing.

The embodiment(s) disclosed herein is compatible to be used with various consumer devices such as smartphones, tablets, laptops, and tablet computers (running Android, iOS, Chrome OS, or Windows 10).

In one example embodiment, the present disclosure uses a piggy-back design that works in conjunction with the device power supply. The charge state control hardware device plugs into the USB port on the consumer device power supply, and the manufacturer's charging cable for the consumer device then plugs into the charge state control device. The piggy-back design represents an easy way for consumers to control charging without making a large investment.

In another example embodiment, the hardware device can be incorporated into a consumer device power supply to create a single unit that both develops the DC charging voltage and interrupts it all in one. This is a variation that would appeal to some consumers who do not wish to carry an additional piece of hardware with them for controlling the battery charge level.

In a further example embodiment, for wireless charging pads/devices, the hardware relay circuitry for the hardware device could be incorporated into the charging pad itself, once again representing an all-in-one solution where preferred.

The present disclosed embodiment(s) is able to operate with the many different charging methods and cable types available for charging consumer devices on the market today (for example, Apple Lightning, USB-A, USB-C, Qi-Wireless Charging, etc.). The present disclosed embodiment(s) has been designed and tested to successfully deal with constantly varying voltages and currents without impeding the charge negotiations between the consumer device and manufacturer's power supply. It works with all fast charge standards and brands, including wireless chargers.

A user is enabled to configure the maximum charge level depending on personal usage patterns and desired device lifespan improvement by using the software application as an interface. The user can also configure more complex charging profiles that involve time-based limits. For example, if a user plugs in their device for charging at 10 PM, charging capacity can be limited to 60% until 6 AM, and then the limit can change to 80% from 6 AM to 10 PM. There are many possibilities for different variations of configuration depending on user preferences.

Battery charge percentage ranges can be set by the user, however the best use of the disclosed embodiment(s) would be to limit the maximum charge percentage to between 40% and 80%, dependent upon user needs. At a maximum charge of 60%, this will allow the user to achieve approximately 8 times more cycle life from their lithium battery when compared to charging fully to 100% every time. If 60% maximum charge limit is too inconvenient for the user, an 80% maximum charge percentage can be used to achieve approximately 4 times the cycle life when compared to charging up to 100% every time. The preferred range to realize optimum benefit from the automated charge state control system would be between 60% maximum battery charge (for overnight use), and 80% maximum battery charge (for all other charging events except overnight charging). In one example embodiment, the charge state control system includes default settings for the maximum battery charge.

Figure 1:
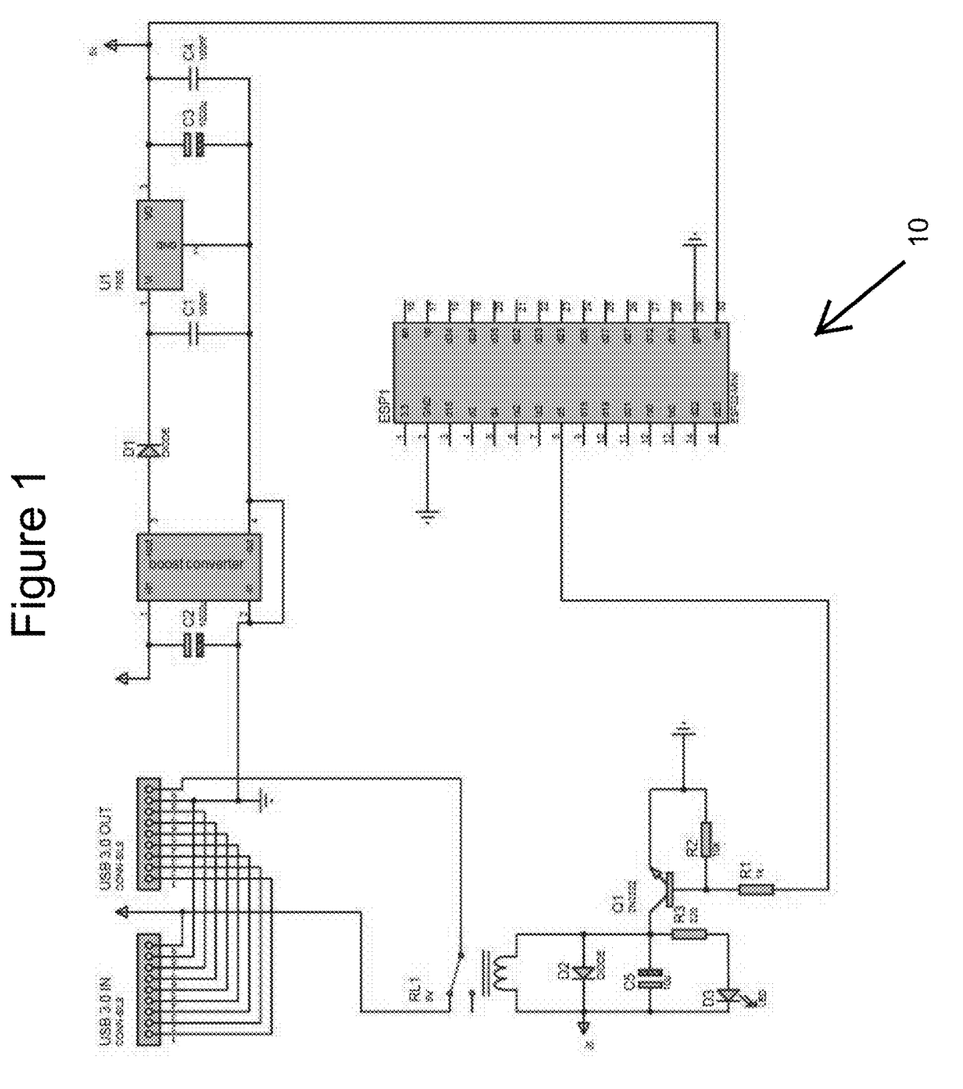
FIG. 1 illustrates a circuit schematic for the charge state control hardware device.

FIG. 1 shows a circuit schematic for the charge state control hardware device 10.

Figure 2:
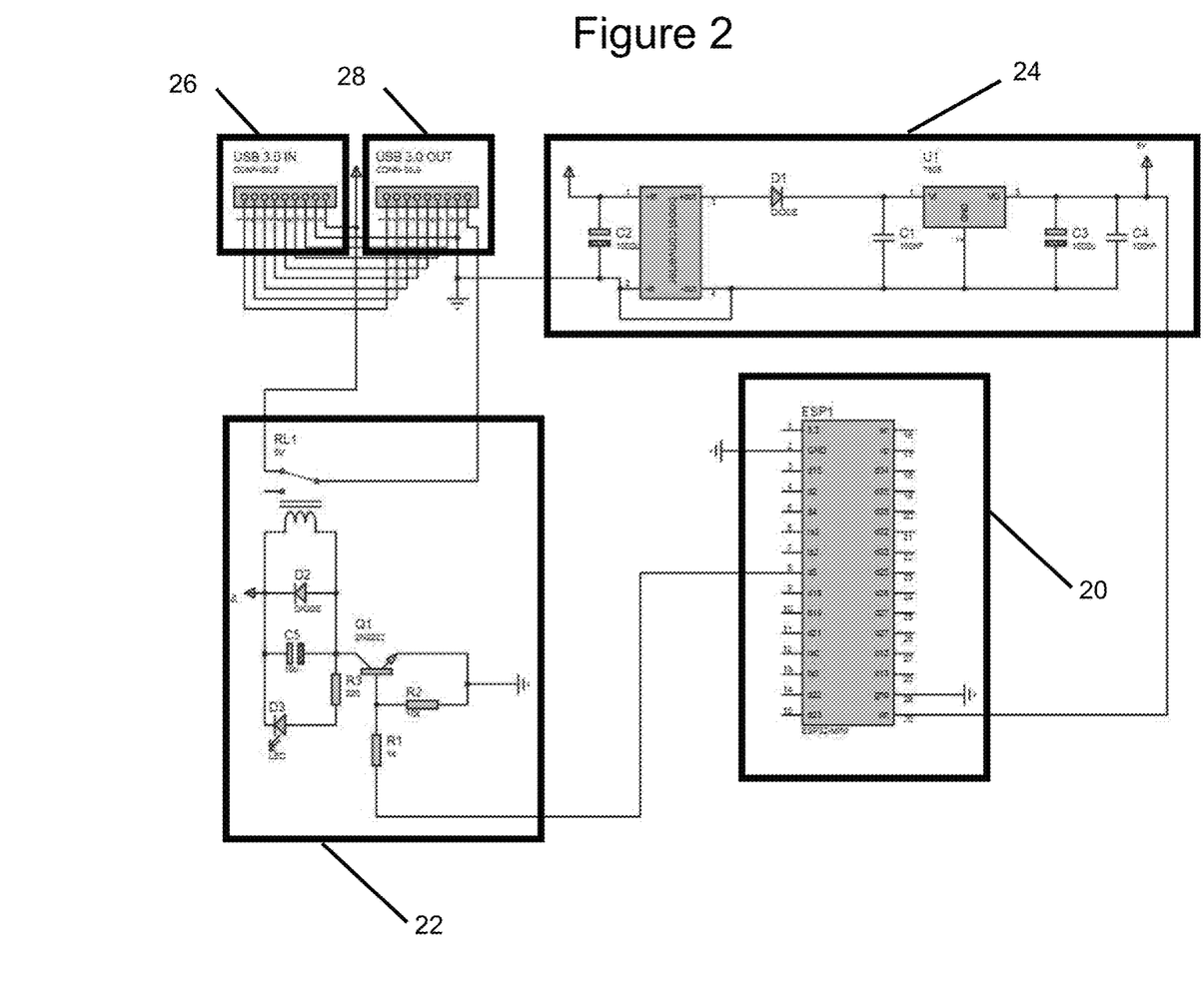
FIG. 2 illustrates the circuit schematic of FIG. 1 with black boxes around the various components.

FIG. 2 shows the circuit schematic of FIG. 1 with black boxes around the various components. The microprocessor 20 is a simple form of programmable logic controller that receives commands from the application software installed on the consumer device and energizes an output accordingly to open or close the relay contacts within the transistor relay circuit 22. The microprocessor 20 is provided as part of the charge state control hardware device 10 and can communicate with the software application on the consumer device via wireless or wired communication (Bluetooth, Wi-Fi, or direct USB serial connection through the charging cable). Communication is enabled via the integrated communication device within the microprocessor, however the microprocessor 20 can also be separated from the communication device and interact with it through a serial connection on the printed circuit board. The communication device (integrated or not) enables the hardware device 10 to be transportable to any location as long as the application software is in connection proximity.

In one example embodiment, the microprocessor 20 features a programmable timer in order to receive timing commands from the software application. The timer function can be automatically activated anytime the communication connection with the software application is lost, for example in the event that the consumer device is powered off, the consumer device goes to sleep or if wireless communication is lost. The timer function from the software application provides the microprocessor 20 with the approximate estimated time left until the device battery is expected to reach the user's desired charging set point. The microprocessor can continue to allow charging current to flow from the device charger to the device for the estimated amount of time when the timer function is active. When the timer finishes, the microprocessor 20 interrupts the charging of the device by opening the relay. The timer function can be cancelled part way through if communication is re-established with the software application.

In another example embodiment, the present disclosure employs a voltage regulation circuit 24 for enabling the universality of the hardware device with respect to the different consumer devices on the market. Each consumer device comes with a proprietary charger that outputs a certain voltage. Furthermore, many fast charging algorithms utilize variable voltages for charging output, meaning that the factory device charger and the device negotiate charging voltages according to pre-established parameters. In addition, the microprocessor 20 can only operate on a single preset voltage. In order to accommodate the wide possibility of input voltages and to supply the microprocessor with the exact voltage required, the voltage regulation circuit 24 boosts or trims any voltages that are too high or too low for the microprocessor and other control circuitry. This allows the hardware device to be applicable to virtually any consumer device. Depending on the type of consumer device and the different possible embodiments of the hardware device, this circuitry can be made to operate with various input and/or output voltages, examples of which include 3.3V to 20V DC, or 120V to 240V AC.

A transistor relay circuit 22 is provided which can include transistors, diodes, and relay contacts. This circuit allows the microprocessor output signal to allow or disallow the charging current to flow from the factory consumer device charger through to the consumer device, whether the hardware device 10 is incorporated within the consumer charger or provided as a piggy-back design as a separate device which connects to the consumer charger.

In a further embodiment, there is provided a connection to the consumer device charger 26 and a connection to the consumer device 28. These terminals allow the factory consumer device charger and the consumer device, respectively, to connect to the hardware device. In this example the hardware device is depicted as a "piggyback" unit, in which both the factory consumer device charger and the consumer device connect to the hardware device. However, the entire circuit can be physically combined with and/or built into a device charger or wireless device charger.

Figure 3:
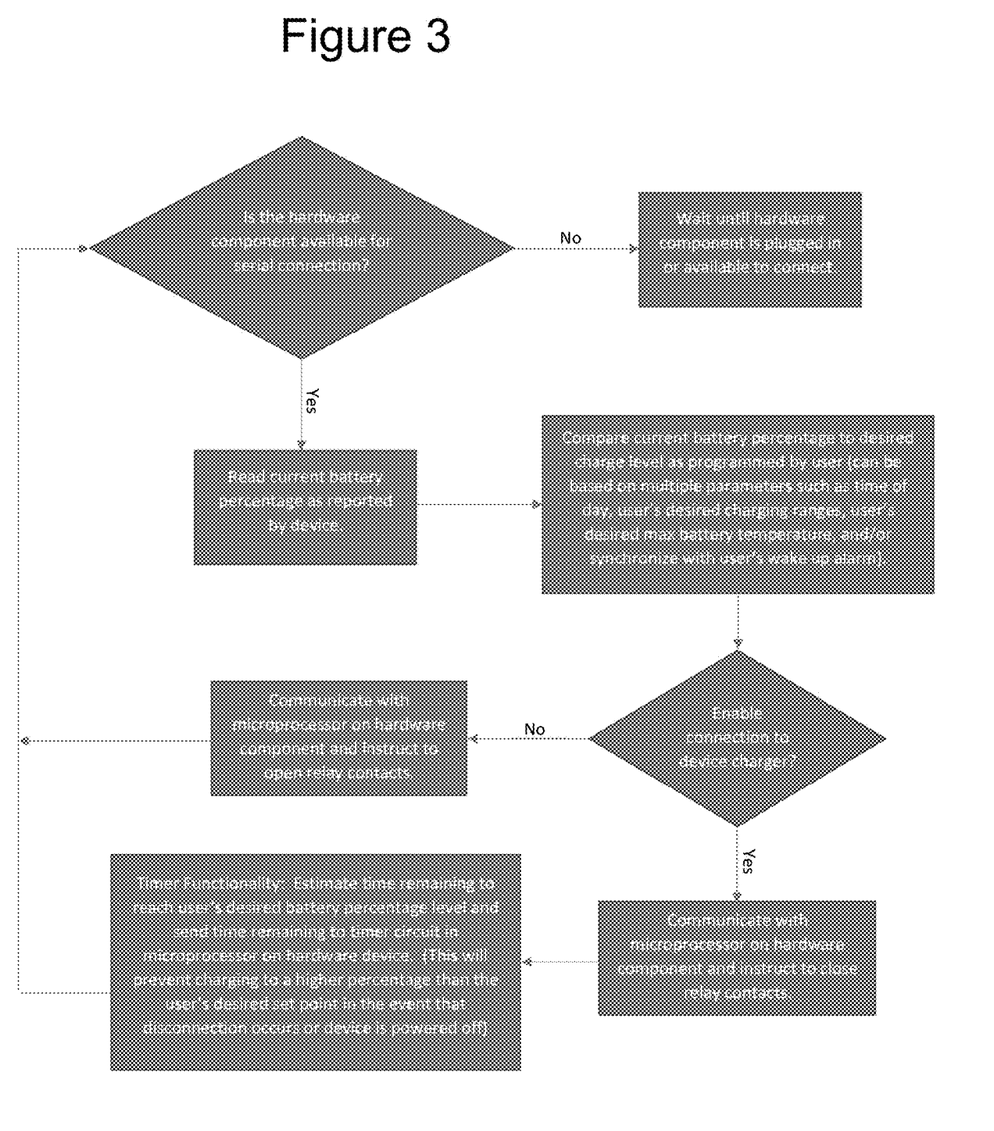
FIG. 3 illustrates a flowchart of the software application functionality on the consumer device.

FIG. 3 shows a flowchart of the software application functionality on the consumer device. The software application waits until the hardware device is plugged in or available for connection. Once available, the current battery percentage of the consumer device is determined and compared to the desired charge level. The setting for the desired charge level can be based on many different parameters, such as time of day, user's desire charge range, user's desired maximum battery temperature and/or user's wake up alarm. If it is determined that the charge state control hardware device should be enabled, the consumer device communicates through the connection to the consumer device 28 to the microprocessor 20 to close the relay contacts in the transistor relay circuit 22. If it is determined that the charge state control hardware device should not be enabled, the consumer device communicates through the connection to the consumer device 28 to the microprocessor 20 to open the relay contacts in the transistor relay circuit 22. The optional timer function can be updated to estimate the time remaining to reach the user's desired battery percentage level and send the time remaining to the timer circuit in the microprocessor on the hardware device.

Figure 4:
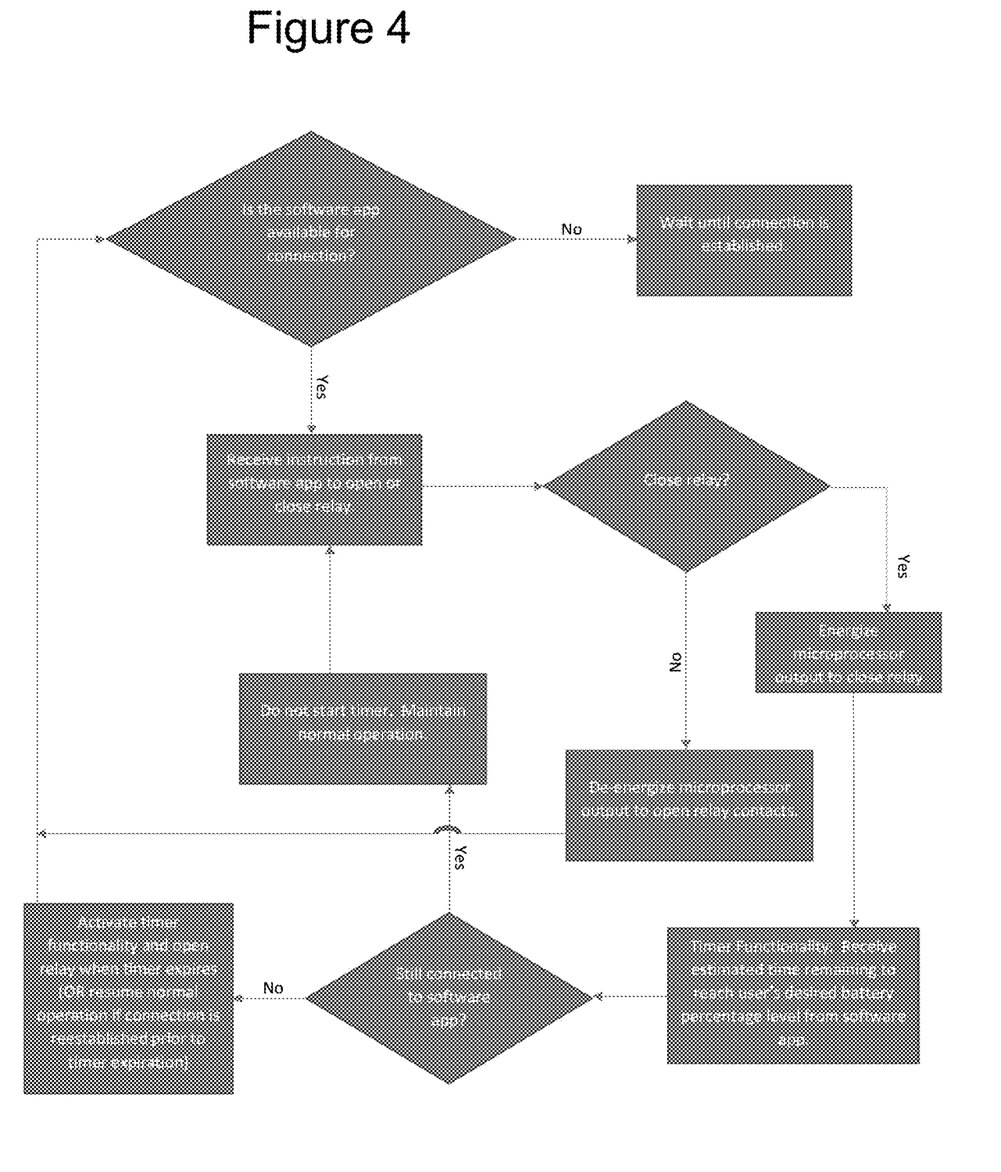
FIG. 4 illustrates a flowchart of the microprocessor functionality on the hardware device.

FIG. 4 shows a flowchart of the microprocessor functionality on the hardware device. Once the software application is available for connection, the microprocessor receives an instruction to open or close the relay. The microprocessor either energizes or de-energizes the output to open or close the relay depending upon the instruction. If the instruction is to close the relay, the microprocessor receives the estimated time remaining to reach a user's desired battery percentage level from the software application on the consumer device. If the consumer device is still connected to the hardware device, the timer is not started and normal operation continues. If the consumer device is no longer connected to the hardware device, the timer function is activated and the relay is opened once the timer expires. If a connection to the software application is reestablished prior to the expiry of the timer, normal operation is resumed.

Figure 5:
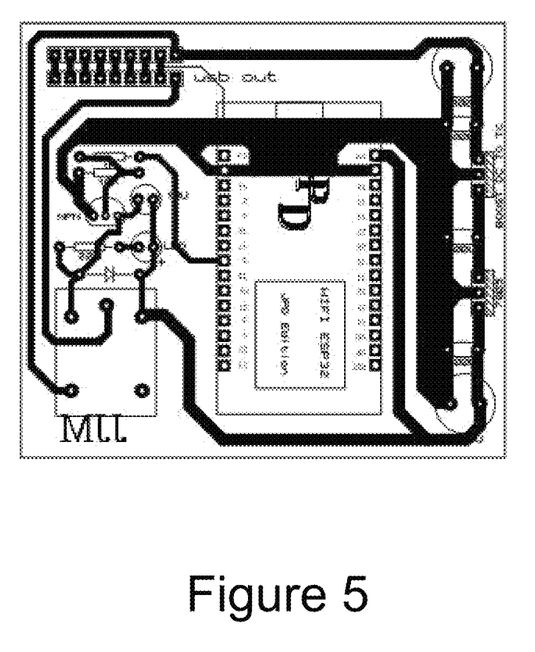
FIG. 5 illustrates a sample schematic of the circuit for the hardware device.

FIG. 5 shows a sample schematic of the circuit for the hardware device.

The specific examples provided herein relate to a charge state control unit, however, the materials, methods of application and arrangements of the disclosure can be varied. For example, the microprocessor could calculate the timer function rather than receiving the estimated timer function from the software application.

Following from the above description, it should be apparent to those of ordinary skill in the art that, while the methods and apparatuses herein described constitute exemplary embodiments of the present invention, the invention described herein is not limited to any precise embodiment and that changes may be made to such embodiments without departing from the scope of the invention as defined by the claims. Additionally, it is to be understood that the invention is defined by the claims and it is not intended that any limitations or elements describing the exemplary embodiments set forth herein are to be incorporated into the interpretation of any claim element unless such limitation or element is explicitly stated. Consequently, the scope of the claims should not be limited by the preferred embodiments set forth in the examples but should be given the broadest interpretation consistent with the description as a whole. Likewise, it is to be understood that it is not necessary to meet any or all of the identified advantages or objects of the invention disclosed herein in order to fall within the scope of any claims, since the invention is defined by the claims and since inherent and/or unforeseen advantages of the present invention may exist even though they may not have been explicitly discussed herein.

What is claimed is:

1. A charge state control hardware device for controlling current sent to a separate consumer device which contains a battery and control software, comprising:
    a microprocessor;
    a transistor relay circuit which is controlled by the microprocessor to open or close a relay;
    a first connector for connection between the consumer device and the transistor relay circuit;
    a second connector for connection to a charger; and
    a communication device for communication of a command from the control software on the consumer device to the microprocessor;
    wherein the microprocessor receives the command and opens or closes the relay based on the command.

2. The charge state control hardware device of claim 1 further comprising a voltage regulation circuit for controlling the voltage provided from the charger to the microprocessor.

3. The charge state control hardware device of claim 1 wherein the second connector is configured to connect to a separate external charger.

4. The charge state control hardware device of claim 1 further comprising a timer for controlling the microprocessor to open or close the relay upon expiry of the timer.

5. A charge state control system for controlling current sent to a consumer device which contains a battery, comprising:
    a software application on the consumer device;
    a hardware device comprising
        a microprocessor;
        a transistor relay circuit which is controlled by the microprocessor to open or close a relay;
        a first connector for connection between the consumer device and the transistor relay circuit; and
        a second connector for connection to a charger;
        wherein the hardware device is separate from the consumer device;
    wherein the software application is configured to
        receive an input from a user;
        determine a level of the battery of the consumer device; and
        send a command to the hardware device to instruct the microprocessor to open or close the relay based on the battery level and the input.

6. The charge state control system of claim 5 wherein the hardware device further comprises a voltage regulation circuit for controlling the voltage provided from the charger to the microprocessor.

7. The charge state control system of claim 5 wherein the input is selected from one or more of the group consisting of time of day, charge range, maximum battery temperature and wake up alarm.

8. The charge state control system of claim 7 wherein the software application instructs the microprocessor to open the relay if the battery level is at an upper limit of the charge range and to close the relay if the battery level is at a lower limit of the charge range.

9. The charge state control system of claim 5 wherein the software application stores a default charge range for the battery level and the software application instructs the microprocessor to open the relay if the battery level is at an upper limit of the charge range and to close the relay if the battery level is at a lower limit of the charge range.

10. The charge state control system of claim 5 wherein the second connector is configured to connect to a charger that is separate from the hardware device.

11. The charge state control system of claim 5 further comprising a timer for controlling the microprocessor to open or close the relay upon expiry of the timer.

12. The charge state control system of claim 5 wherein the software application is configured to monitor temperature of the battery of the consumer device, and the command is based on the temperature.

13. A charge state control hardware device for controlling current sent to a separate consumer device which contains a battery and control software, comprising:
    a microprocessor;
    a transistor relay circuit which is controlled by the microprocessor to open or close a relay; and a communication device for communication of a command from the control software on the consumer device to the microprocessor;

wherein the microprocessor receives the command and opens or closes the relay based on the command.

14. A charge state control system for controlling current sent to a consumer device which contains a battery, comprising:

a software application on the consumer device;

a hardware device comprising
- a microprocessor; and
- a transistor relay circuit which is controlled by the microprocessor to open or close a relay;
- wherein the hardware device is separate from the consumer device;

wherein the software application is configured to
- receive an input from a user;
- determine a level of the battery of the consumer device; and
- send a command to the hardware device to instruct the microprocessor to open or close the relay based on the battery level and the input.

* * * * *